US012164484B2

(12) United States Patent
Jacobs et al.

(10) Patent No.: US 12,164,484 B2
(45) Date of Patent: Dec. 10, 2024

(54) DATA SCHEMA MATCHING TO OPTIMIZE THE QUALITY OF APPLICATIONS

(71) Applicant: NEC Laboratories Europe GmbH, Heidelberg (DE)

(72) Inventors: Tobias Jacobs, Heidelberg (DE); Sivahari Nandakumar, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/337,094

(22) Filed: Jun. 19, 2023

(65) Prior Publication Data

US 2024/0330249 A1 Oct. 3, 2024

Related U.S. Application Data (60) Provisional application No. 63/454,968, filed on Mar. 28, 2023.

(51) Int. Cl.
G06F 16/21 (2019.01)
G06F 16/2458 (2019.01)
G06F 16/25 (2019.01)

(52) U.S. Cl.
CPC ........ *G06F 16/211* (2019.01); *G06F 16/2462* (2019.01); *G06F 16/252* (2019.01)

(58) Field of Classification Search
None
See application file for complete search history.

(56) References Cited

U.S. PATENT DOCUMENTS 8,694,561 B2    4/2014 Peukert
2020/0081899 A1  3/2020 Shapur et al.
(Continued)

FOREIGN PATENT DOCUMENTS

CN    112685385 B  * 11/2021
KR    20220127733 A * 9/2022

OTHER PUBLICATIONS

Bernstein, Philip A. et al.; "Generic Schema Matching, Ten Years Later"; *Proceedings of the VLDB Endowment*; Aug. 1, 2011; pp. 695-701; vol. 4, No. 11; ACM Publications; New York, NY, USA.
(Continued)

*Primary Examiner* — Augustine K. Obisesan
(74) *Attorney, Agent, or Firm* — Leydig, Voit & Mayer, Ltd.

(57) ABSTRACT

A method for automatically selecting input for a smart city application includes determining data schema for a data lake locally stored at a local smart city platform instance and determining aggregate statistical information of data corresponding to a data schema concept. The determined data schema and aggregate statistical information are sent to a global matcher with an identifier of the application. An input matching is received, from the global matcher, for the application, wherein the input matching provides, for each respective input of the application, a respective data schema concept. Data corresponding to the respective data schema concept for each respective input of the data-driven application is provided as input to the application. The input matching is determined using a trained quality of service (QOS) scoring function trained to minimize a QoS error of aggregated QoS scores against a ground-truth QoS score computed from predictive accuracy and/or user feedback.

20 Claims, 6 Drawing Sheets

(56) References Cited

U.S. PATENT DOCUMENTS

| | | | |
|---|---|---|---|
| 2020/0257665 | A1 | 8/2020 | Yan et al. |
| 2021/0065063 | A1* | 3/2021 | Gazzetti .................. G06N 20/20 |
| 2021/0174219 | A1* | 6/2021 | Gupta ..................... G06N 20/00 |
| 2021/0263945 | A1* | 8/2021 | Siebel ..................... H04L 69/40 |
| 2022/0058166 | A1* | 2/2022 | Bhatia ................. G06F 16/2456 |
| 2022/0132303 | A1* | 4/2022 | Viswanathan ...... H04L 41/0816 |
| 2022/0164363 | A1 | 5/2022 | Jochum et al. |
| 2022/0374399 | A1* | 11/2022 | Kementsietsidis ... G06F 16/284 |

OTHER PUBLICATIONS

Da Silva, Jomar et al.; "Alin: improving interactive ontology matching by interactively revising mapping suggestions"; *The Knowledge Engineering Review*, Nov. 1, 2020; pp. 1-23; vol. 35; Cambridge University Press; Cambridge, UK.

Pan, Zhiyu et al.; "Semantic-Similarity-Based Schema Matching for Management of Building Energy Data"; *Energies*; Nov. 24, 2022; pp. 1-24; vol. 15, No. 8894; MDPI; Basel, Switzerland.

Peukert, Eric et al.; "Comparing Similarity Combination Methods for Schema Matching"; *Informatik 2010: Service Science—Neue Perspektiven für die Informatik, Beiträge der 40. Jahrestagung der Gesellschaft für Informatik e.V. (GI)*; Sep. 27, 2010; pp. 1-10; vol. 1; Universität Leipzig; Leipzig, Germany.

Sahay, Tanvi et al.; "Schema Matching using Machine Learning"; *2020 7th International Conference on Signal Processing and Integrated Networks*; Nov. 24, 2019; pp. 1-7; vol. 1; ArXiv.org, Cornell University; Ithaca, NY, USA.

Shraga, Roee et al.; "PoWareMatch: a Quality-aware Deep Learning Approach to Improve Human Schema Matching—Technical Report"; *ACM Journal of Data and Information Quality*; Sep. 15, 2021; pp. 1-36; vol. 14, No. 3; ArXiv.org, Cornell University; Ithaca, NY, USA.

\* cited by examiner

DATA SCHEMA MATCHING TO OPTIMIZE THE QUALITY OF APPLICATIONS

CROSS-REFERENCE TO PRIOR APPLICATION

Priority is claimed to U.S. Provisional Application Ser. No. 63/454,968 filed on Mar. 28, 2023, which is hereby incorporated by reference herein.

FIELD

The present disclosure relates to artificial intelligence (AI) and machine learning, and in particular, to a method, system and computer-readable medium for matching data schema with the inputs to optimize the quality of applications such as data-driven smart city applications.

BACKGROUND

A variety of techniques have been proposed to find matchings between different data schemata or between data schemata and ontologies (see Bernstein, Philip A., et al., "Generic schema matching, ten years later," Proceedings of the VLDB Endowment 4.11: 695-701 (2011)), which is hereby incorporated by reference herein. Such techniques can be applied to address the problem of matching the inputs of data-driven applications with existing data in the domain of smart district applications by modeling the application data needs in terms of concepts of an ontology and then finding a matching between the ontology and the schemata of the available data. The information used by such techniques is limited to (a) descriptions of the data schemata and of the ontology concepts (e.g. class names, class descriptions) and (b) ground truth in the form of matches that have been confirmed by human domain experts, e.g. as part of an active learning loop (see, e.g., Da Silva, Jomar, et al., "Alin: improving interactive ontology matching by interactively revising mapping suggestions," The Knowledge Engineering Review 35: e1 (2020), which is hereby incorporated by reference herein.

SUMMARY

In an embodiment, the present disclosure provides a method for automatically selecting input for a smart city application. The method includes determining data schema for a data lake locally stored at a local smart city platform instance, the data schema including a plurality of data schema concepts, and determining aggregate statistical information of data corresponding to at least one data schema concept of the plurality of data schema concepts. The determined data schema and the determined aggregate statistical information are sent to a global matcher together with an identifier of the smart city application. An input matching is received, from the global matcher, for the smart city application, wherein the input matching provides, for each respective input of the smart city application, a respective data schema concept. Data corresponding to the respective data schema concept for each respective input of the data-driven application is provided as input to the smart city application. The input matching is determined using a trained quality of service (QOS) scoring function, the QoS scoring function being trained to minimize a QoS error of aggregated QoS scores against a ground-truth QoS score computed from predictive accuracy and/or user feedback.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

This present disclosure describes methods and systems for matching data schemata with the inputs of data-driven applications, e.g. data-driven smart city applications. The methods and corresponding systems of the present disclosure enhance traditional methods of matching data ontologies—and the concepts, properties, and relationships between them that are specified by said ontologies—to inputs of data-driven applications with a novel mechanism that takes those applications' Quality-of-Service (QOS) feedback into account.

The present disclosure describes methods and systems for matching inputs of data-driven applications with existing data, e.g. in the domain of smart district applications. Local instances of smart district platforms (deployed, e.g., for one city or one district of a city) have access to a multitude of local data sources, both real-time and historical (which collectively constitute a data lake), and can use this data to feed the inputs of smart district applications. A catalog of possible applications is provided with the platform, and each application comes with certain data requirements. However, the data requirements for each application provided with the platform are specified independently from the specific platform instance and the data sources specifically available to the specific platform instance. Thus, before deploying an application, a matching task, for finding a suitable match between a particular application's data needs and data sources in an available data lake—or for finding a suitable application given the available data lake, must be carried out.

Matching tasks can be categorized as follows. In input matching, a particular application is selected and the best input for that particular application is identified from available data sources in a data lake. In application recommendation, a data lake is considered, and applications—which, given the limitation of the data sources available in the data lake, will perform best—are identified and ranked. In gap analysis, a data lake is considered, and applications—which, given the limitation of the data sources available in the data lake, cannot be run—as well as their unmatched data inputs, are identified.

The potential to utilize data-driven applications (such as those in a catalog of applications provided with a smart district platform) to create value from data found in a data lake is limited by a number of factors. First is the requirement of foreknowledge of correct matching between specific data structures (and data fields thereof) found in a data lake and the data inputs required by those data-driven applications. Manual annotation (whereby specific data structures and data fields thereof are manually matched to the data inputs required by data-driven applications) provides the requisite foreknowledge but renders deployment of such data-driven applications expensive. Additionally, meaningful descriptions of data schema, i.e. the structure and organization of the data in the data lake or portions thereof, may not be present, and a centralized repository of all structured and unstructured data available to a particular instance of a smart district platform may have data stored in accordance with various data schemata. Accordingly, providing meaningful descriptions of the various available data sources may require further manual annotation, thereby similarly increasing the expense of deploying such data-driven applications. Accordingly, mining an existing data lake to identify data structures and elements thereof that provide suitable data inputs for data-driven applications has, in the past, required substantial manual input, and automation of such mining has been notoriously difficult and inaccurate.

The present disclosure describes methods and systems that overcome the limitations described in the preceding paragraph and improve the quality and correctness of the results obtained from mining a data lake to perform input matching and to further improve application recommendation and gap analysis tasks. Specifically, methods and systems of the present disclosure take into account and utilize, when performing matching tasks, two additional sources of information. First, aggregate information computable from a particular data structure or an element thereof, including mean, variance, number of data points, resolution, and other descriptive statistics, is taken into account and utilized by novel processing routines of the methods and systems described herein. Second, QoS feedback, e.g. in the form of user ratings, metrics of predictive quality, frequency of usage, frequency of failures and internal application errors, from the data-driven applications themselves is additionally taken into account and utilized by novel processing routines of the methods and systems described herein.

Embodiments of the methods and systems of the present disclosure utilize (i) novel training routines to develop a machine learning prediction model configured to predict a QoS that results from a data-driven application's use of a particular data input and (ii) a novel algorithm for optimizing the prediction model when constructing a new matching. The methods and systems of the present disclosure thereby both improve the performance of and decrease the deployment cost of data-driven applications, e.g. applications of smart-district (e.g. smart city) platforms. In particular, the methods and systems of the present disclosure can improve the performance of data-driven applications by identifying optimal data inputs and thereby improving the accuracy of application outputs. For example, the methods and systems of the present disclosure improve the accuracy of predictions made by smart city applications that rely on data provided from internet of things (IoT) sensors as well as data sourced through other means, and thereby improve actionable insights output by such smart city applications. In particular, the methods and systems of the present disclosure can improve predictions, made by smart city applications, of energy demand and thereby better prescribe parameters for energy production that minimize greenhouse gas emission and better match production and consumption levels. Similarly, the methods and systems of the present disclosure can improve predictions, made by smart city applications, of transportation infrastructure demand and thereby prescribe parameters for transportation infrastructure operation that reduce costs and energy consumption. Furthermore, by reducing the amount of manual data annotation required for operation of smart city applications, the methods and systems of the present disclosure decrease the costs associated with implementing and operating smart-city application deployment and thereby facilitate more efficient management of municipal infrastructure.

The methods and systems of the present disclosure utilize (i) novel training routines to develop a machine learning prediction model configured to predict a QoS that results from a data-driven application's use of a particular data input and (ii) a novel algorithm for optimizing the prediction model when constructing a new matching.

According to a first aspect, a method is provided for automatically selecting input for a smart city application. The method includes determining data schema for a data lake locally stored at a local smart city platform instance, the data schema including a plurality of data schema concepts, and further includes determining aggregate statistical information of data corresponding to at least one data schema concept of the plurality of data schema concepts. In addition, the method includes sending the determined data schema and the determined aggregate statistical information to a global matcher together with an identifier of the smart city application, and receiving, from the global matcher, an input matching for the smart city application, wherein the input matching provides, for each respective input of the smart city application, a respective data schema concept. Furthermore, the method includes providing, as input to the smart city application, data corresponding to the respective data schema concept for each respective input of the data-driven application. The input matching is determined using a trained quality of service (QOS) scoring function, the QoS scoring function being trained to minimize a QoS error of aggregated QoS scores against a ground-truth QoS score computed from predictive accuracy and/or user feedback.

According to a second aspect, the present disclosure provides the method according to the first aspect, wherein the aggregate statistical information of the data corresponding to the at least one data schema concept includes, for each respective data schema concept of the at least one data schema concept: a mean of the data corresponding to the respective data schema concept, a median of the data corresponding to the respective data schema concept, and/or a number of entries in the data corresponding to the respective data schema concept.

According to a third aspect, the present disclosure provides the method according to the first or second aspects, wherein the global matcher is configured to compute, using the trained QoS scoring function, pairwise matching scores between each respective input of the smart city application and each data schema concept of the plurality of data schema concepts, and the global matcher is further configured to determine, based on the pairwise matching scores, the input matching for the smart city application.

According to a fourth aspect, the present disclosure provides the method according to the any of the first to third aspects, wherein the trained scoring function is configured to predict a quality of service (QOS) score for each pair of a respective input of the smart city application and a respective data schema concept.

According to a fifth aspect, the present disclosure provides the method according to the any of the first to fourth aspects, wherein the trained scoring function is trained using QoS feedback information provided by a plurality of local smart city platform instances.

According to a sixth aspect, the present disclosure provides the method according to the any of the first to fifth aspects, wherein the method further includes collecting, from the smart city application, QoS feedback information pertaining to a QoS realized from the input matching; and sending the QoS feedback information to the global matcher.

According to a seventh aspect, the present disclosure provides the method according to the any of the first to sixth aspects, wherein the trained scoring function is trained using QoS feedback information provided by that local smart city platform instance and at least one other local smart city platform instance, and the trained scoring function is updated based on the QoS feedback information.

According to an eighth aspect, the present disclosure provides the method according to the any of the first to seventh aspects, wherein the trained scoring function is trained using the QoS feedback information provided by the plurality of local smart city platform instances and based on active learning approaches and/or predetermined ground-truth input matchings.

According to a ninth aspect, the present disclosure provides a system is provided for automatically selecting input for a smart city application. The system includes processing circuitry configured to determine data schema for a data lake locally stored at a local smart city platform instance, the data schema including a plurality of data schema concepts, and further configured to determine aggregate statistical information of data corresponding to at least one data schema concept of the plurality of data schema concepts. In addition, the processing circuitry is configured to send the determined data schema and the determined aggregate statistical information to a global matcher together with an identifier of the smart city application, and to receive, from the global matcher, an input matching for the smart city application, wherein the input matching provides, for each respective input of the smart city application, a respective data schema concept. Furthermore, the processing circuitry is configured to provide, as input to the smart city application, data corresponding to the respective data schema concept for each respective input of the data-driven application. The input matching is determined using a trained quality of service (QOS) scoring function, the QoS scoring function being trained to minimize a QoS error of aggregated QoS scores against a ground-truth QoS score computed from predictive accuracy and/or user feedback.

According to a tenth aspect, a method is provided for automatically selecting input for a smart city application. The method includes training a quality of service (QOS) scoring function to minimize a QoS error of aggregated QoS scores against a ground-truth QoS score computed from predictive accuracy and/or user feedback, and receiving, from a local smart city platform instance: a data schema for a locally stored data lake, the data schema including a plurality of data schema concepts, aggregate statistical information of data corresponding to at least one data schema concept of the plurality of data schema concepts, and an identifier of the smart city application. The method further includes determining, using the trained QoS scoring function, an input matching for the smart city application, wherein the input matching provides, for each respective input of the smart city application, a respective data schema concept, and providing, to the local smart city platform instance, the input matching.

According to an eleventh aspect, the present disclosure provides the method according to the tenth aspect, wherein the aggregate statistical information of the data corresponding to the at least one data schema concept includes, for each respective data schema concept of the at least one data schema concept: a mean of the data corresponding to the respective data schema concept, a median of the data corresponding to the respective data schema concept, and/or a number of entries in the data corresponding to the respective data schema concept.

According to a twelfth aspect, the present disclosure provides the method according to the tenth or eleventh aspects, wherein the determining, using the trained QoS scoring function, the input matching for the smart city application comprises: determining pairwise matching scores between each respective input of the smart city application and each data schema concept of the plurality of data schema concepts, and determining, based on the pairwise matching scores, the input matching for the smart city application.

According to a thirteenth aspect, the present disclosure provides the method according to the any of the tenth to twelfth aspects, wherein the trained scoring function is configured to predict a quality of service (QOS) score for each pair of a respective input of the smart city application and a respective data schema concept.

According to a fourteenth aspect, the present disclosure provides the method according to the any of the tenth to thirteenth aspects, wherein the trained scoring function is trained using QoS feedback information provided by a plurality of local smart city platform instances.

According to a fifteenth aspect, the present disclosure provides the method according to the any of the tenth to fourteenth aspects, wherein the method further includes receiving, from the local smart city platform instance, QoS feedback information pertaining to a QoS realized from the input matching; and updating the trained scoring function based on the QoS feedback information.

According to a sixteenth aspect, a system is provided for automatically selecting input for a smart city application. The system includes processing circuitry configured to train a quality of service (QOS) scoring function to minimize a QoS error of aggregated QoS scores against a ground-truth QoS score computed from predictive accuracy and/or user feedback and to receive, from a local smart city platform instance: a data schema for a locally stored data lake, the data schema including a plurality of data schema concepts, aggregate statistical information of data corresponding to at least one data schema concept of the plurality of data schema concepts, and an identifier of the smart city application. The processing circuitry is further configured to determine, using the trained QoS scoring function, an input matching for the smart city application, wherein the input matching provides, for each respective input of the smart city application, a respective data schema concept, and provide, for the local smart city platform instance, the input matching.

A first advantage of the present disclosure is to utilize novel machine learning training routines to train a prediction model to predict a QoS provided by an application resulting from a matching of the input of the application to particular data sources, i.e. to particular schema concept descriptions.

A second advantage of the present disclosure is to use, in addition to the schema concept descriptions, aggregate information computed from the data (descriptive statistics like e.g. mean, variance, number of data points) as input to the QoS prediction model.

To realize the first advantage and make maximal use of available data, the collection of application feedback, the model training, as well as computation of optimal matchings, is organized in a way that all QoS feedback is collected and processed in a global manner. A conflicting requirement, which is important especially in the domain of smart cities and districts, is that the cities/districts remain in control of their data and do not have to send all data to a central instance. These conflicting requirements are both met with the system architecture depicted in FIG. 1.

Figure 1:
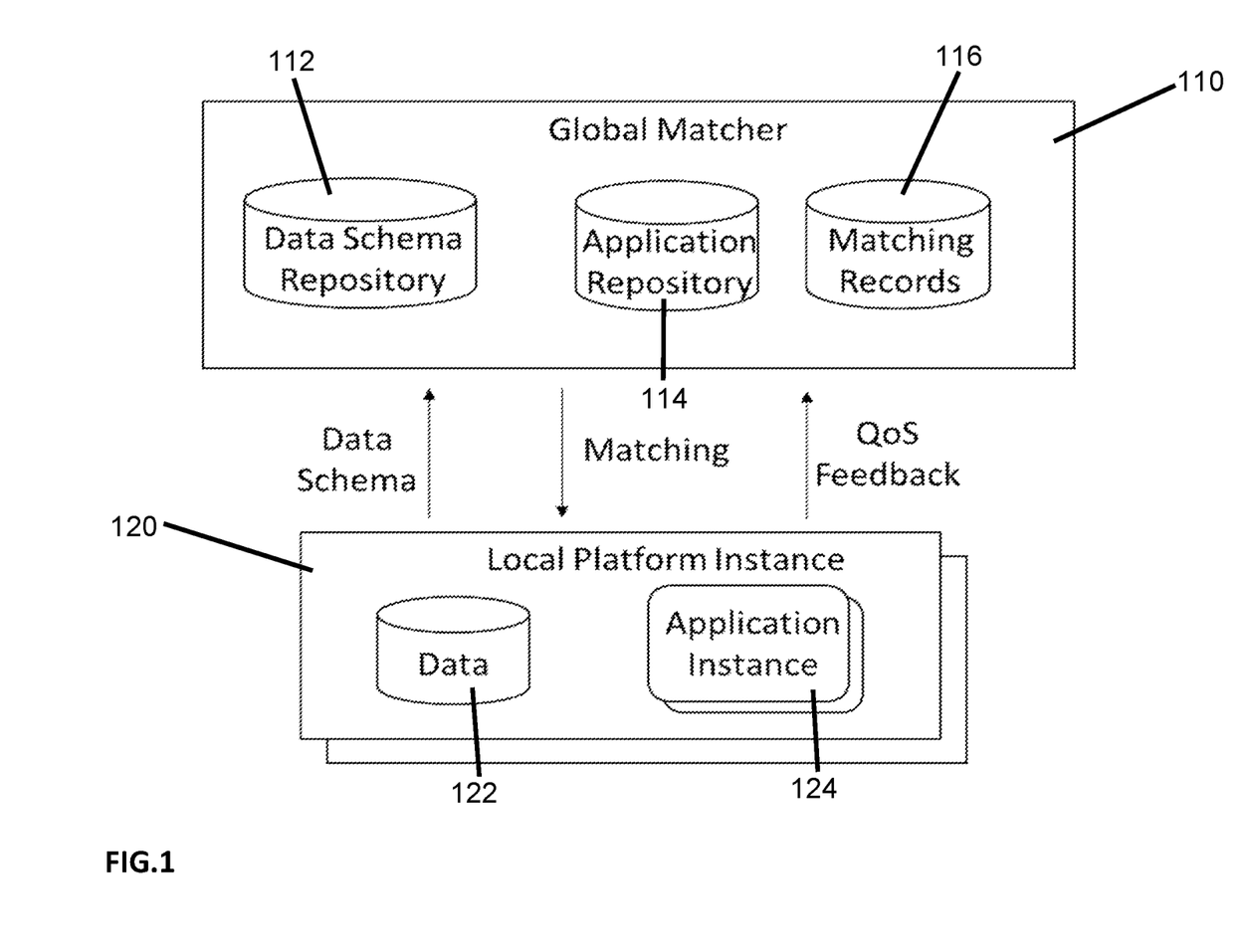
FIG. 1 illustrates a matching system architecture.

The system architecture depicted in FIG. 1 consists of a Global Matcher 110 that has access only to data schemata, aggregate information, QoS feedback, and multiple local platform instances 120 that hold the data and perform actual data processing in the application deployments. In the matching system architecture illustrated in FIG. 1, the Global Matcher 110 stores a data schema repository 112, which includes records and corresponding details of various data schema that provide structures for databases that hold local data sources available to a local platform instance such as local platform instance 120. In addition, the Global Matcher 110 also stores an application repository 114, that includes all applications provided with a smart district platform (of which local platform instance 120 is a local instance), and matching records 116 that match the QoS provided by a particular application to a particular data input. Each local platform instance 120 holds its local data sources 122 and runs local application instances, e.g. application instance 124.

To deploy a local new application instance, the following steps are executed. First, the Local Platform Instance 120 computes the data schema and various aggregate information for the data. Second, the Local Platform Instance 120 sends the data schema and the aggregate information to the Global Matcher together with an identifier of the application it wants to deploy. Third, the Global Matcher 110 computes-using a trained QoS prediction model-one or more possible matchings between the data schema and the selected application, and sends the matchings to the Local Platform Instance 120. Specifically, the Global Matcher uses the trained QoS prediction model to compute matchings (i.e. of specific data in the data schema employed by the local data sources 122 and the application input of the selected application) that are likely to result in a high QoS for the application, and those matchings are provided to the Local Platform Instance 120. Fourth, the Local Platform Instance 120 deploys the application and feeds it with data following a matching suggested by the Global Matching Platform. The Local Platform Instance 120 then collects QoS feedback from the application and sends it to the Global Matcher 110 together with the selected matching. Fifth, the Global Matcher 110 uses the collected QoS information to update the matching records 116 and improve its future suggested matchings. In various embodiments, the five steps need not be performed in the exact order listed herein.

The QoS prediction model used by the Global Matcher 110 is described below. First, a feature vector $x_d \in R_H$ describing each possible concept $d_1, \ldots, d_m$ in a data schema is constructed. The feature vector $x_d$ is an H-dimensional vector that has a value for each of H different features. The H features can include information about the concept name and description (e.g. the names of the table and columns containing the data) as well as aggregate information about the data itself.

Second, each input i of the given application has a feature vector $y_i \in R^I$ with I dimensions containing all available information about the required application input.

Third, a match scoring function $f_\Theta(x_d, y_i)$, which is a trainable function that predicts a matching score, is provided:

$$scr_{d,i} := f_\Theta(x_d, y_i) \in (0, 1),$$

where $scr_{d,i}$ is a quantitative score that represent a QoS component that results from the use of data of data schema concept d as input to a field i of the application input of the form $y_i$. A score close to 1 means that the match is likely to contribute to a high QoS of the application. The scoring functions could be any Machine Learning regression model. The scoring function may vary from simple linear regression model to a deep neural network and depends on the application and data.

Figure 2:
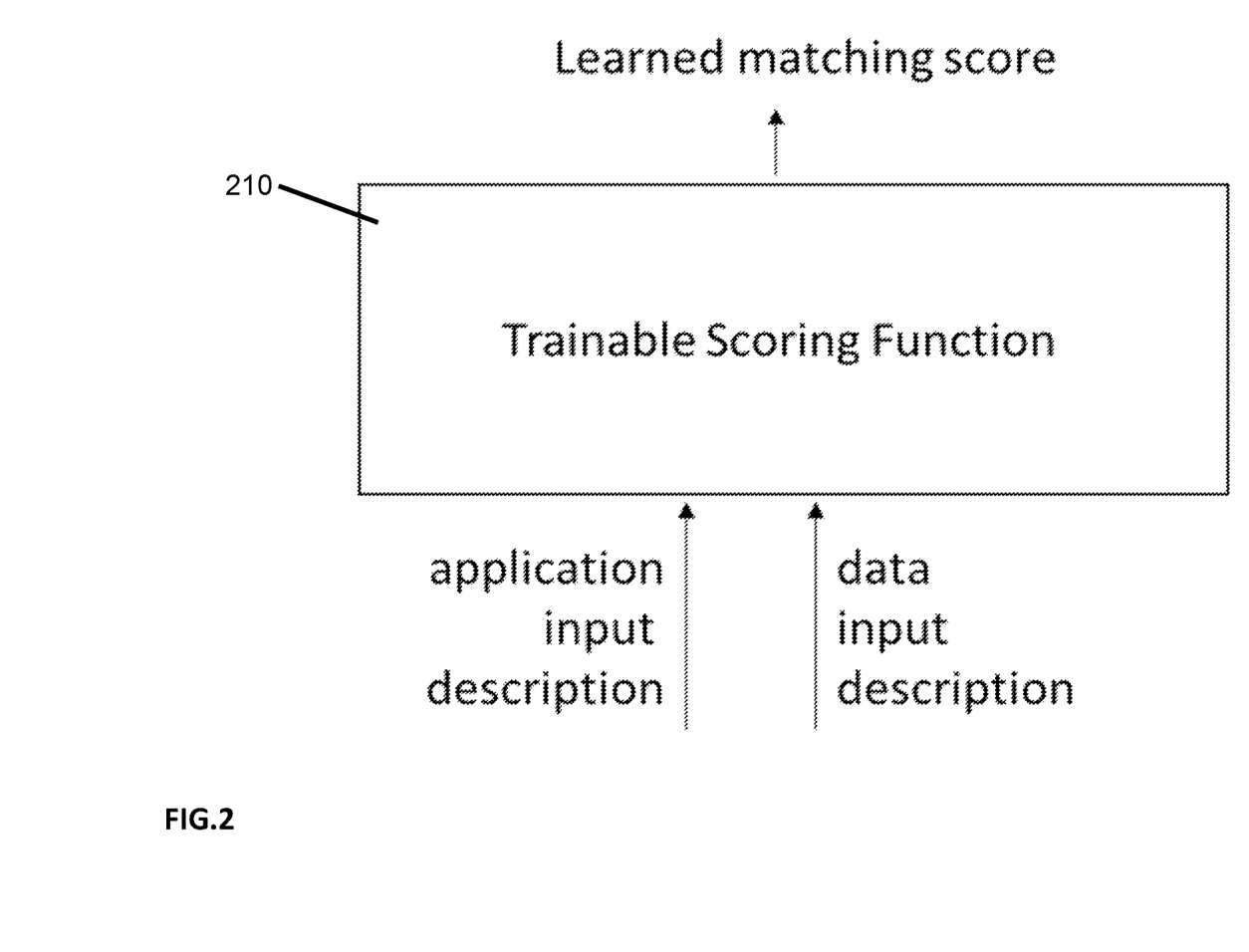
FIG. 2 illustrates a match scoring function.

FIG. 2 illustrates a trainable scoring function 210 according to an embodiment of the present disclosure. Given application inputs $i_1, \ldots, i_n$ and the set of data schema concepts $d_1, \ldots, d_n$, the trainable scoring function $f_\Theta$ can determine an optimal matching, computing:

$$\underset{d_1,\ldots,d_n \in D}{\mathrm{argmax}}\, f_\Theta(x_{d_1}, y_{i_1}) + \ldots + f_\Theta(x_{d_n}, y_{i_n}).$$

This computation involves solving a two-dimensional combinatorial matching problem, which can be realized efficiently using known algorithms (e.g. the so-called Hungarian method).

Training of the QoS prediction model used by the Global Matcher 110 is described below. If ground truth on correct and incorrect matches of data schema, represented by the feature vector $x_d$, to the input of a given application, represented by the feature vector $y_i$, is available (e.g. from active learning approaches, or from a subset of matchings created by experts), that ground truth can be used to train the parameters $\Theta$ of the scoring function $f_\Theta$. However, such feedback may not be available. Accordingly, the application QoS feedback can be used instead. For this, the QoS can be modeled to be an aggregate of the scores of the individual matches:

$$QoS = \frac{1}{n}(f_\Theta(x_{d_1}, y_{i_1}) + \ldots + f_\Theta(x_{d_n}, y_{i_n}))$$

As the ground truth on the QoS is available, it can be used for training the parameters $\Theta$ using standard error functions and gradient descent methods.

The formula for the QoS provided above is one simple embodiment of the techniques of the present disclosure. An advanced embodiment could compute a weighted sum instead of the simple mean:

$$QoS = \mathrm{Softmax}(w_\phi(y_{i_1}), \ldots, w_\phi(y_{i_n})) * (f_\Theta(x_{d_1}, y_{i_1}), \ldots, f_\Theta(x_{d_m}, y_{i_n})),$$

where * represents the scalar product of two vectors, $W_\Phi$ is a parameterized function of the application input descriptions, and both the parameters $\Phi$ and $\Theta$ are trained against the QoS error. That way, the importance of the matching scores for the final QoS is computed from the application's input descriptions.

Figure 3:
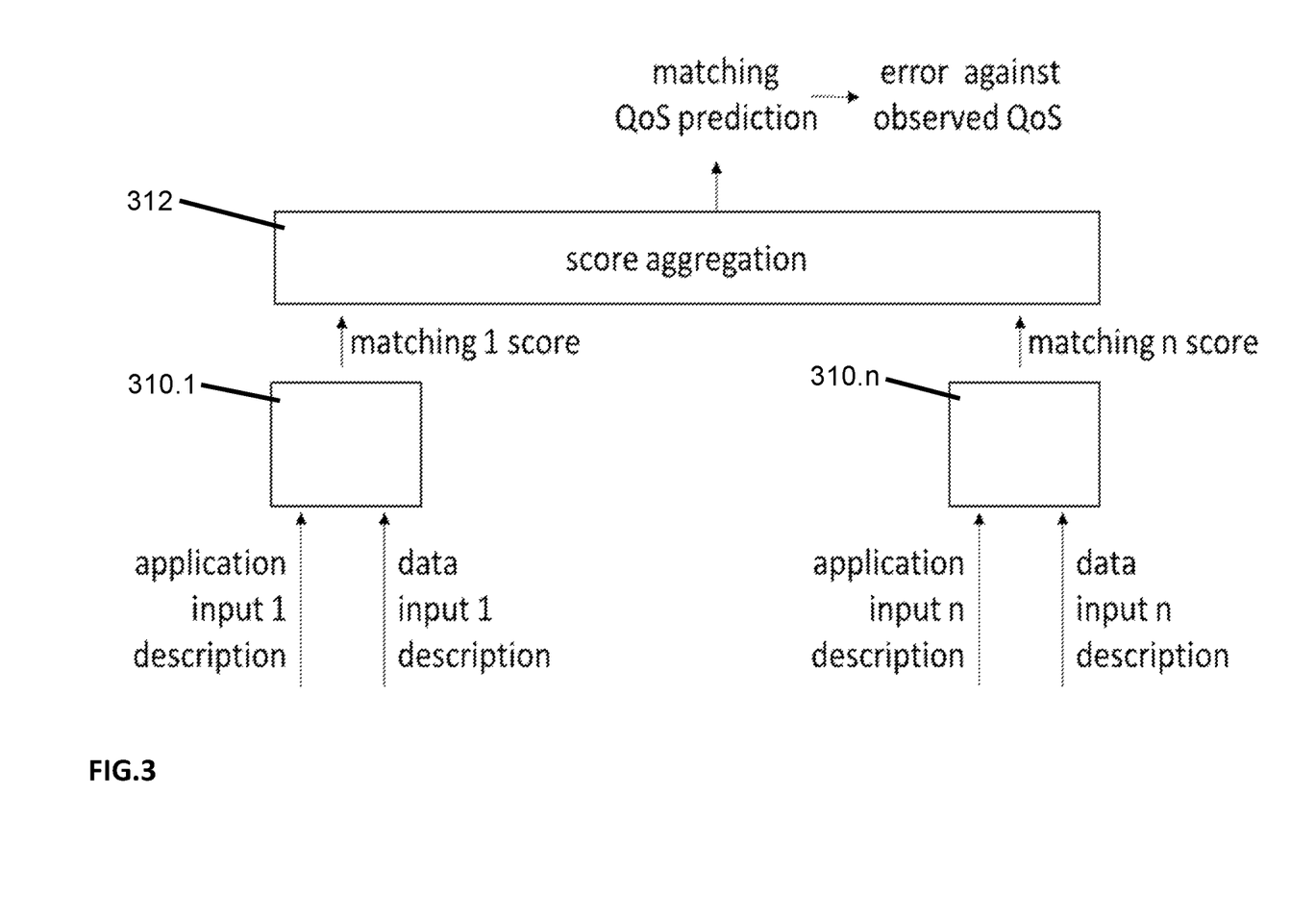
FIG. 3 illustrates a model architecture used for training scoring functions.

A third advantage of the present disclosure is computing scores of individual matches using a parameterized trainable scoring function 310, using the pairwise computed scores as input to a combinatorial matching algorithm (i.e. score aggregation 312), and training the parameterized trainable scoring function 310 to minimize the error of the aggregated scores against the perceived application QoS. The scoring function will be a supervised regression model. FIG. 3 illustrates a model architecture used for training a scoring function according to an embodiment of the present disclosure.

Figure 4:
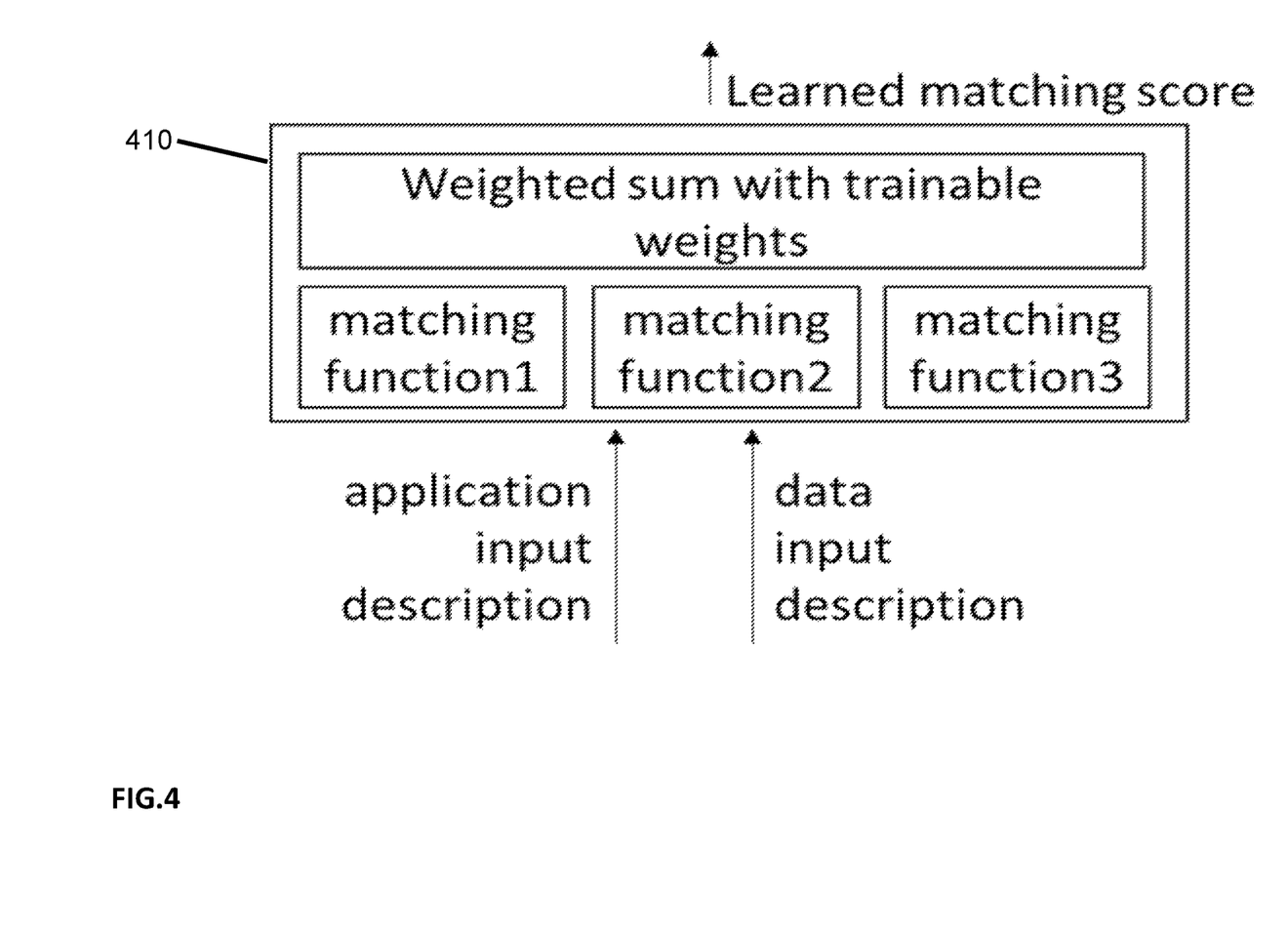
FIG. 4 illustrates a match scoring function constructed from non-parameterized matching functions.

A fourth advantage of the present disclosure relates to the architecture of the parameterized trainable scoring function. The trainable scoring function, in the embodiment illustrated in FIG. 4, is a weighted sum, with trainable weights, over a number of non-parameterized matching metrics, with the weights initialized as equal numbers. FIG. 4 provides an illustration of match scoring function 410 constructed from non-parameterized matching functions.

In order to reduce the dependency on having enough collected QoS experience for training, models can be constructed to initially rely on match scoring metrics that do not need training. The most typical metrics in this field are string comparison metrics, as well as metrics based on comparing pre-trained string embeddings. Given a number of such metrics $m_1, \ldots, m_k: R^H \times R^I \rightarrow (0,1)$, the trainable scoring function has the structure:

$$f_\Theta(x_d, y_i) = \theta_1 m_1(x_d, y_i) + \ldots + \theta_k m_k(x_d, y_i),$$

where $\Theta=(\theta_1, \ldots, \theta_n)$ is the vector of trainable parameters, initialized to $$\left(\frac{1}{k}, \ldots, \frac{1}{k}\right),$$

such that the initial scoring function simply computes the simple mean over the k metrics and only gets refined over time as QoS data becomes available.

Figure 5:
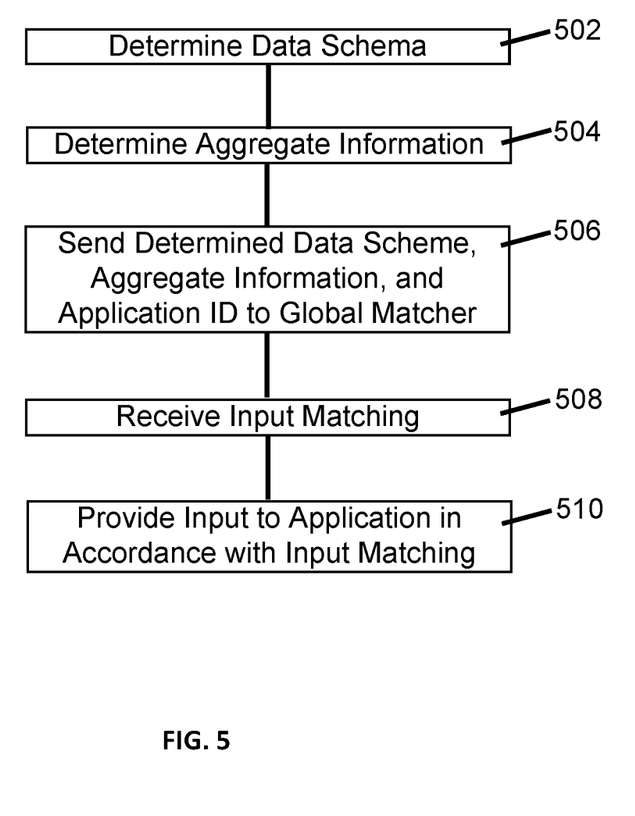
FIG. 5 is a flow diagram of a method according to an embodiment.

FIG. 5 is a flow diagram of a method according to an embodiment of the invention. At 502, the method determines data schema for a data lake locally stored at a local smart city platform instance. The data schema includes a plurality of data schema concepts. At 504, the method determines aggregate statistical information of data corresponding to at least one data schema concept of the plurality of data schema concepts. At 506, the method sends the determined data schema and the determined aggregate statistical information to a global matcher together with an identifier of a smart city application. At 508, the method receives, from the global matcher, an input matching for the smart city application. The input matching provides, for each respective input of the smart city application, a respective data schema concept. At 510, the method provides, as input to the smart city application, data corresponding to the respective data schema concept for each respective input of the data-driven application. The input matching is determined using a trained quality of service (QOS) scoring function, the QoS scoring function being trained to minimize a QoS error of aggregated QoS scores against a ground-truth QoS score computed from predictive accuracy and/or user feedback. The QoS scoring function can be trained, e.g., as described above, i.e. by using pairwise computed scores output by the QoS scoring function as input to a combinatorial matching algorithm, and training the QoS scoring function to minimize the error of the aggregated QoS scores against a perceived application QoS. The smart city application can be, e.g., an application for predicting air quality and providing, based on air quality predictions, recommendations for traffic management and personal behavior (health), an application for predicting the total solar energy that will be generated in a future period of time and providing recommendations for production planning in factories and supplemental energy generation by power stations, an application for predicting pH level of the sewage water during a future period of time and providing recommendations for water treatment plants and for automatic wastewater management, or an application for predicting the probability of a traffic block in a road at a particular point in time in the future or during a future period of time, and recommending alternate roads to thereby ensure a smooth flow of traffic in the city.

Figure 6:
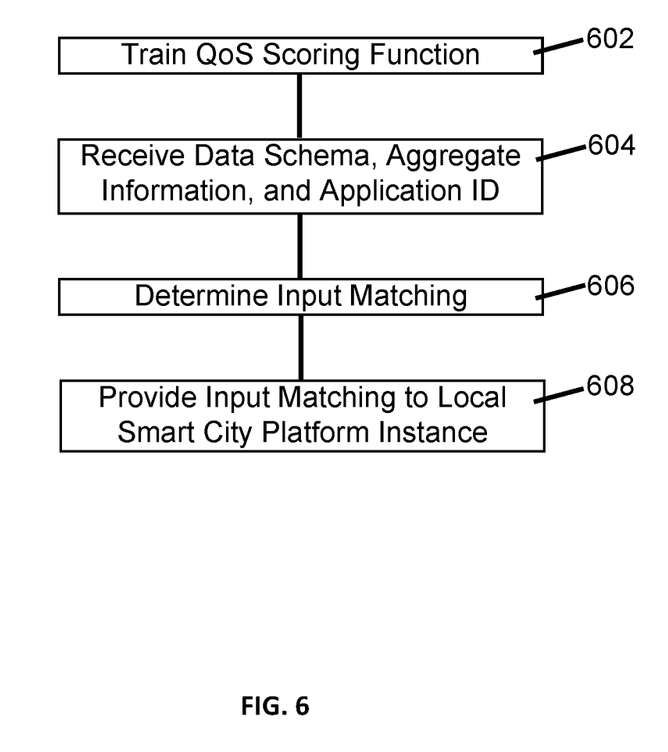
FIG. 6 is a flow diagram of a method according to a further embodiment.

FIG. 6 is a flow diagram of a method according to an embodiment of the invention. At 602, the method trains a quality of service (QOS) scoring function to minimize a QoS error of aggregated QoS scores against a ground-truth QoS score computed from predictive accuracy and/or user feedback. The training can be performed, e.g., as described above, i.e. by using pairwise computed scores output by the QoS scoring function as input to a combinatorial matching algorithm, and training the QoS scoring function to minimize the error of the aggregated QoS scores against a perceived application QoS. At 604, the method receives, from a local smart city platform instance: a data schema for a locally stored data lake, the data schema including a plurality of data schema concepts, aggregate statistical information of data corresponding to at least one data schema concept of the plurality of data schema concepts, and an identifier of the smart city application. At 606, the method determines, using the trained QoS scoring function, an input matching for the smart city application. The input matching provides, for each respective input of the smart city application, a respective data schema concept. At 608, the method provides, to the local smart city platform instance, the input matching. The smart city application can be, e.g., an application for predicting air quality and providing, based on air quality predictions, recommendations for traffic management and personal behavior (health), an application for predicting the total solar energy that will be generated in a future period of time and providing recommendations for production planning in factories and supplemental energy generation by power stations, an application for predicting pH level of the sewage water during a future period of time and providing recommendations for water treatment plants and for automatic wastewater management, or an application for predicting the probability of a traffic block in a road at a particular point in time in the future or during a future period of time, and recommending alternate roads to thereby ensure a smooth flow of traffic in the city.

Air Quality Prediction

Historical and real-time information about air quality, traffic, and weather can be processed in the data platform of a smart city or a smart district in a smart city. Such a smart city can run a local instance of a smart city platform, and the smart city platform provides an application for predicting air quality and providing, based on such air quality predictions, recommendations for traffic management and personal behavior (health). The application for predicting air quality is a data-driven application that receives, as input, various data pertaining to, e.g., air quality, traffic, weather, and other condition and provides, as output, an air quality prediction and, e.g., infrastructure operation recommendations. The accuracy of the application's predictions and the suitability of its recommendations (e.g. to promote better air quality, reduce emissions, etc.) is highly dependent on selecting input data suitable for making accurate predictions. Embodiments of the present disclosure can automatically identify, from a data lake, data to provide to the application that promotes accurate air quality predictions, thereby enhancing QoS.

QoS about the air quality predictions can be measured by historical comparisons with observed values. Such comparisons can be made both during training and during prediction. In both instances, QoS feedback can be provided to the methods and systems for automatically matching available data to application inputs. Descriptive statistics of each data entity, e.g. a column of a table, a node of a knowledge graphs, or a field in a javascript object notation (JSON) file are computed. With those two types of additional inputs (i.e. QoS feedback and descriptive statistics), the techniques of the present disclosure can be applied as described above for improved automated schema matching.

For an example the application for predicting air quality may require data inputs 'Co2,' 'temperature' and 'traffic density,' and the present application could automatically determine that, from all data stored in a data lake, the data labeled 'weather', 'carbon dioxide,' 'traffic counter,' 'carbon monoxide,' and 'solar irradiation' provide data that results in the highest possible QoS for the application. In this manner, the methods of the present disclosure thereby help to automatically select data from an air quality data lake, resulting in more accurate predictions of air quality, and better targeted recommendations for traffic management and citizens' health.

Solar Energy Prediction

Historical and real-time information about weather and solar energy can be processed in the data platform of s smart city or a smart district in a smart city. Such a smart city can run a local instance of a smart city platform that provides an application for predicting the total solar energy that will be generated in a future period of time, e.g. during the next few hours/days and providing recommendations for production planning in factories and supplemental energy generation by power stations.

QoS about the solar energy predictions can be measured by historical comparisons with observed values. Such comparisons can be made both during training of a predictive QoS model and following deployment of a trained QoS predictive model. In both instances, QoS feedback can be provided to the methods and systems for automatically matching available data to application inputs. Descriptions, e.g. titles or names, of data schema concepts, e.g. a column of a table, a node of a knowledge graph, or a field in a JSON file, can be determined, and descriptive statistics, e.g. mean, median, and number of data elements, of the data therein can be computed. With those two types of additional inputs (i.e. QoS feedback and descriptive statistics), the techniques of the present disclosure can be applied as described above for improved automated schema matching.

For example, the application for predicting solar energy generation may require data inputs 'solar irradiation,' and 'solar panel size,' and the systems and methods of the present disclosure could automatically determine that, from all data stored in a data lake, the data labeled 'weather,' 'carbon dioxide,' 'traffic counter,' 'carbon monoxide,' 'sunlight,' and 'device information' provide data that results in the highest possible QoS for the application. In this manner, the methods of the present disclosure find best available weather forecast data automatically and match the application with best other data available, resulting in more accurate predictions of solar energy, and better targeted recommendations for production planning in factories and power stations.

Wastewater Prediction

Historical and real-time information about pH level in sewage water, current local population of an area of interest, and other environmental data can be processed in the data platform of a smart city or a smart district in a smart city. Such a smart city can run a local instance of a smart city platform, and the smart city platform provides an application for predicting pH level of the sewage water after next few hours and provides recommendations for water treatment plants and for automatic management of wastewater, e.g. to neutralize the PH level and perform water storage management in a manner that does not overload the equipment, sewage system, and environment. The accuracy of the application's predictions and the suitability of its recommendations (e.g. to promote optimal wastewater management, etc.) is highly dependent on selecting input data suitable for making accurate predictions. Embodiments of the present disclosure can automatically identify, from a data lake, data to provide to the application that promotes accurate wastewater property predictions, thereby enhancing QoS.

QoS about the wastewater predictions can be measured by historical comparisons with observed values. Further, the success of automatic treatment can be measured and factored into the QoS. Such comparisons can be made both during training and during prediction. In both instances, QoS feedback can be provided to the methods and systems for automatically matching available data to application inputs. Descriptions, e.g. titles or names, of data schema concepts, e.g. a column of a table, a node of a knowledge graph, or a field in a JSON file, can be determined, and descriptive statistics, e.g. mean, median, and number of data elements, of the data therein can be computed. With those two types of additional inputs (i.e. QoS feedback and descriptive statistics), the techniques of the present disclosure are applied as described above for improved automated schema matching.

For example, the application for predicting wastewater properties may require data inputs 'pH level,' 'irrigation,' 'time-of-day,' and the systems and methods of the present disclosure could automatically determine that, from all data stored in a data lake, the data labeled data 'acidity,' 'rainfall,' 'solar irradiation,' and 'outdoor temperature' provide data that results in the highest possible QoS for the application. In this manner, the techniques of the present disclosure will be able to find the best data for the application which helps in better predictions, resulting in more accurate predictions of pH value of the wastewater, and better, more environmental-friendly recommendations for wastewater treatment plants. This results in environmentally friendly wastewater management.

Road Traffic Block Prediction

Historical and real-time information about number of vehicles on each road in a city on each day of the week can be processed in the data platform of a smart city of a smart district in a smart city. Such a smart city can run a local instance of a smart city platform, and the smart city platform provides an application for predicting the probability of a traffic block in a road at a particular point in time in the future or during a few hour period in the future, and gives recommendations for alternate roads to thereby ensure a smooth flow of traffic in the city.

QoS about the traffic predictions made by the traffic prediction application can be measured by historical comparisons with observed values. Further, the effects of the recommendations provided by the traffic prediction application can be measured and factored into the QoS feedback. Such comparisons and effects can be made both during training and during prediction. In both instances, QoS feedback can be provided to the methods and systems for automatically matching available data to application inputs. Descriptive statistics of each data entity, e.g. a column of a table, a node of a knowledge graphs, or a field in a javascript object notation (JSON) file are computed. With those two types of additional inputs (i.e. QoS feedback and descriptive statistics), the techniques of the present disclosure can be applied as described above for improved automated schema matching.

For example, the application for predicting traffic congestion may require data inputs 'traffic density,' and 'weather information,' and the systems and methods of the present disclosure could automatically determine that, from all data stored in a data lake, the data labeled 'weather,' 'carbon dioxide,' 'traffic counter,' 'carbon monoxide,' 'sunlight,' and 'device information' provide data that results in the highest possible QoS for the application. In this manner, more accurate predictions of traffic blocks and/or congestion in a road, and better scheduling of traffic lights and automated speed limit assignment, can be provided, which in effect ensures smooth flow of traffic, thereby saving time and energy and decreasing pollution.

According to an embodiment, the present disclosure provides a method for automatically matching the data needs of smart city applications against the available data sources (e.g. traffic, environment, air quality, weather, water quality, etc.). The method includes:

1. training, by a Global Matcher, a scoring function to minimize a QoS error of an aggregated QoS score against the ground-truth application QoS score, wherein the ground-truth QoS score is computed from predictive accuracy and/or user feedback.
2. determining, by a Local Platform Instance, a data schema for a locally stored data lake and aggregate statistical information of data stored, according to data concepts in the data schema, in the locally stored data lake.
3. sending, by the Local Platform Instance, the determined data schema and the aggregate statistical information to the Global Matcher together with an identifier of a smart city application selected for deployment.
4. computing, by the Global Matcher by using the trained scoring function, pairwise matching scores between each application input and each data concept in the schema.
5. feeding, by the Global Matcher, the computed scores into an optimal matching algorithm, determining, by the matching algorithm, a matching of each application input to a data concept in the data schema, and sending, by the Global Matcher, the resulting matching to the Local Platform Instance.
6. utilizing, by the Local Platform Instance, the matching to create better value from data. Specifically, feeding data from the locally stored data lake to the smart city application selected for deployment as suggested by the determined matching, collecting QoS feedback from the smart city application selected for deployment, and sending the QoS feedback to the Global Matcher.
7. using, by the Global Matcher, the collected QoS information to improve future suggested matchings, e.g. by re-training the scoring function to minimize the QoS error in view of the collected QoS feedback.

The present disclosure provides for a number of beneficial aspects and technical advantages as compared with prior art data analysis techniques. Specifically, embodiments of the present disclosure provide for the following:

1. Using machine learning to train a prediction model to predict application QoS resulting from a matching of data sources to application input.
2. Constructing, to solve the input matching problem for a given application and given data sources, a matching that optimizes the QoS according to the trained prediction model.
2. Using, in addition to data schema concept descriptions, aggregate information computed from the data (descriptive statistics, e.g. mean, variance, number of data points) as input to the QoS prediction model.
3. Computing scores of individual matches using a parameterized function, using the pairwise computed scores as input to a combinatorial matching algorithm, and training the scoring function to minimize the error of the aggregated scores against the perceived application QoS.
4. Defining the match scoring function as a weighted sum, with trainable weights, over a number of non-parameterized matching metrics, with the weights initialized as equal numbers.

As detailed herein, the present disclosure provides methods and systems that provide for better matching of available data to application inputs, thereby leading to improved application QoS. Specifically, the present disclosure provides techniques for enhancing predictive algorithms by automatically identifying data stored pursuant to data schema concepts to use as data inputs into data-driven application, e.g. predictive models. In this manner, the present disclosure provides for improvements in the field of artificial intelligence based predictive modeling by automatically filtering data in a data lake to provide optimal data inputs for data-driven applications, e.g. predictive models. In this manner, the present disclosure provides techniques that automatically identify input data-thereby decreasing costs of application deployment—while simultaneously improving the accuracy of predictive models.

The methods automatically matching data from available data sources to data needs of data-driven applications, as described herein, can be implemented in or by hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. Devices and systems for automatically matching data from available data sources to data needs of data-driven applications, as described herein, can include such hardware and/or software, and can further include a non-transitory memory configured to store data and executable program code which, when executed by the processing circuitry causes the processing circuitry to perform the functions, operations and methods described herein.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for automatically selecting input for a smart city application, the method comprising:
   determining data schema for a data lake locally stored at a local smart city platform instance, the data schema including a plurality of data schema concepts,
   determining aggregate statistical information of data corresponding to at least one data schema concept of the plurality of data schema concepts;
   sending the determined data schema and the determined aggregate statistical information to a global matcher together with an identifier of the smart city application;
   receiving, from the global matcher, an input matching for the smart city application, wherein the input matching provides, for each respective input of the smart city application, a respective data schema concept; and
   providing, as input to the smart city application, data corresponding to the respective data schema concept for each respective input of the data-driven application,
   wherein the input matching is determined using a trained quality of service (QOS) scoring function, the QoS scoring function being trained to minimize a QoS error of aggregated QoS scores against a ground-truth QoS score computed from predictive accuracy and/or user feedback.

2. The method according to claim 1, wherein the aggregate statistical information of the data corresponding to the at least one data schema concept includes, for each respective data schema concept of the at least one data schema concept:
   a mean of the data corresponding to the respective data schema concept,
   a median of the data corresponding to the respective data schema concept, and/or
   a number of entries in the data corresponding to the respective data schema concept.

3. The method according to claim 1, wherein the global matcher is configured to compute, using the trained QoS scoring function, pairwise matching scores between each respective input of the smart city application and each data schema concept of the plurality of data schema concepts, and
   wherein the global matcher is further configured to determine, based on the pairwise matching scores, the input matching for the smart city application.

4. The method according to claim 3, wherein the trained scoring function is configured to predict a quality of service (QOS) score for each pair of a respective input of the smart city application and a respective data schema concept.

5. The method according to claim 4, wherein the trained scoring function is trained using QoS feedback information provided by a plurality of local smart city platform instances.

6. The method according to claim 5, wherein the trained scoring function is trained using the QoS feedback information provided by the plurality of local smart city platform instances and based on active learning approaches and/or predetermined ground-truth input matchings.

7. The method according to claim 4, further comprising collecting, from the smart city application, QoS feedback information pertaining to a QoS realized from the input matching; and
   sending the QoS feedback information to the global matcher.

8. The method according to claim 7, wherein the trained scoring function is trained using QoS feedback information provided by that local smart city platform instance and at least one other local smart city platform instance, and
   wherein the trained scoring function is updated based on the QoS feedback information.

9. The method according to claim 1, wherein the QoS scoring function is configured to:
   receive first data structures, each first data structure corresponding to a respective data schema concept of the plurality of data schema concepts,
   receive second data structures, each second data structure corresponding to a respective input of the smart city application, and
   compute, for pairs of a respective first data structure and a second data structure, a quantitative score.

10. The method according to claim 9, wherein each first data structure includes aggregate statistical information of the data corresponding to the respective data schema concept.

11. A method for automatically selecting input for a smart city application, the method comprising:
    training a quality of service (QOS) scoring function to minimize a QoS error of aggregated QoS scores against a ground-truth QoS score computed from predictive accuracy and/or user feedback;
    receiving, from a local smart city platform instance:
       a data schema for a locally stored data lake, the data schema including a plurality of data schema concepts,
       aggregate statistical information of data corresponding to at least one data schema concept of the plurality of data schema concepts, and
       an identifier of the smart city application;
    determining, using the trained QoS scoring function, an input matching for the smart city application, wherein the input matching provides, for each respective input of the smart city application, a respective data schema concept; and
    providing, to the local smart city platform instance, the input matching.

12. The method according to claim 11, wherein the aggregate statistical information of the data corresponding to the at least one data schema concept includes, for each respective data schema concept of the at least one data schema concept:
- a mean of the data corresponding to the respective data schema concept,
- a median of the data corresponding to the respective data schema concept, and/or
- a number of entries in the data corresponding to the respective data schema concept.

13. The method according to claim 11, wherein the determining, using the trained QoS scoring function, the input matching for the smart city application comprises:
- determining pairwise matching scores between each respective input of the smart city application and each data schema concept of the plurality of data schema concepts, and
- determining, based on the pairwise matching scores, the input matching for the smart city application.

14. The method according to claim 13, wherein the trained scoring function is configured to predict a quality of service (QOS) score for each pair of a respective input of the smart city application and a respective data schema concept.

15. The method according to claim 14, wherein the trained scoring function is trained using QoS feedback information provided by a plurality of local smart city platform instances.

16. The method according to claim 15, further comprising receiving, from the local smart city platform instance, QoS feedback information pertaining to a QoS realized from the input matching; and
updating the trained scoring function based on the QoS feedback information.

17. The method according to claim 11, wherein the QoS scoring function is configured to:
- receive first data structures, each first data structure corresponding to a respective data schema concept of the plurality of data schema concepts,
- receive second data structures, each second data structure corresponding to a respective input of the smart city application, and
- compute, for pairs of a respective first data structure and a second data structure, a quantitative score.

18. The method according to claim 17, wherein each first data structure includes aggregate statistical information of the data corresponding to the respective data schema concept.

19. A system for automatically selecting input for a smart city application, the system comprising processing circuitry configured to:
- train a quality of service (QOS) scoring function to minimize a QoS error of aggregated QoS scores against a ground-truth QoS score computed from predictive accuracy and/or user feedback;
- receive, from a local smart city platform instance:
  - a data schema for a locally stored data lake, the data schema including a plurality of data schema concepts,
  - aggregate statistical information of data corresponding to at least one data schema concept of the plurality of data schema concepts, and
  - an identifier of the smart city application;
- determine, using the trained QoS scoring function, an input matching for the smart city application, wherein the input matching provides, for each respective input of the smart city application, a respective data schema concept; and
- provide, for the local smart city platform instance, the input matching.

20. The system according to claim 19, wherein the QoS scoring function is configured to:
- receive first data structures, each first data structure corresponding to a respective data schema concept of the plurality of data schema concepts, wherein each first data structure includes aggregate statistical information of the data corresponding to the respective data schema concept,
- receive second data structures, each second data structure corresponding to a respective input of the smart city application, and
- compute, for pairs of a respective first data structure and a second data structure, a quantitative score.

* * * * *